United States Patent
Nakanishi (10) Patent No.: US 9,973,226 B2
(45) Date of Patent: May 15, 2018

(54) RECEPTION DEVICE AND METHOD FOR ADJUSTING RECEPTION DEVICE

(71) Applicant: LAPIS Semiconductor Co., Ltd., Yokohama (JP)

(72) Inventor: Seiji Nakanishi, Yokohama (JP)

(73) Assignee: LAPIS SEMICONDUCTOR CO., LTD., Yokohama (JP)

( * ) Notice: Subject to any disclaimer, the term of this patent is extended or adjusted under 35 U.S.C. 154(b) by 270 days.

(21) Appl. No.: 15/050,380

(22) Filed: Feb. 22, 2016

(65) Prior Publication Data

US 2016/0248613 A1  Aug. 25, 2016

(30) Foreign Application Priority Data

Feb. 23, 2015 (JP) ................. 2015-032915

(51) Int. Cl.
  *H04B 1/16* (2006.01)
  *H04B 1/10* (2006.01)

(52) U.S. Cl.
  CPC ......... *H04B 1/1615* (2013.01); *H04B 1/1036* (2013.01)

(58) Field of Classification Search
  None
  See application file for complete search history.

(56) References Cited

U.S. PATENT DOCUMENTS

2005/0260949 A1* 11/2005 Kiss ............... H04B 17/21
  455/67.14
2012/0288045 A1* 11/2012 Nakanishi ......... H03H 11/1291
  375/350

FOREIGN PATENT DOCUMENTS

JP  2012-239016 A  12/2012

\* cited by examiner

*Primary Examiner* — Vinncelas Louis
(74) *Attorney, Agent, or Firm* — Rabin & Berdo, P.C.

(57) ABSTRACT

A reception device receives a radio frequency (RF) signal and obtains a data signal from the RF signal in a desired reception channel. The reception device includes a bandpass filter, and first and second test signals are input to the bandpass filter in the test mode to obtain bandpass-filtered first and second test signals, respectively. Each of frequencies of the first and second test signals is lower and higher than a frequency of the desired reception channel, respectively. The reception device detects lower and higher frequency signal intensities from the bandpass-filtered first and second test signals, respectively, in the test mode, and adjusts a central frequency of the passband of the bandpass filter using a difference between the lower and higher frequency signal intensities so as to reduce a difference between the central frequency of the passband and the frequency of the desired reception channel.

11 Claims, 10 Drawing Sheets

| FREQUENCY | RECEPTION INTENSITY VALUE | CORRECTION VALUE | PHASE |
|---|---|---|---|
| f1 | P1 | H1 | FS1 |
| f2 | P2 | H2 | FS2 |
| f3 | P3 | H3 | FS3 |
| ⋮ | ⋮ | ⋮ | ⋮ |
| f(n−1) | P(n−1) | H(n−1) | FS(n−1) |
| fn | Pn | Hn | FSn |

RECEPTION DEVICE AND METHOD FOR ADJUSTING RECEPTION DEVICE

BACKGROUND OF THE INVENTION

Technical Field

The present invention relates to a reception device, particularly relating to a reception device in which a wirelessly transmitted signal is received and demodulated, and to a method for adjusting a reception device.

Background Art

Such a reception device includes a mixer that converts a radio frequency (RF) signal received through an antenna to an intermediate frequency band to generate an intermediate frequency (IF) signal, and a bandpass filter (hereinafter abbreviated as "BPF") through which the band of a desired reception channel within IF signal is allowed to pass. As such a BPF, actively driven BPFs are known in which an amplifier is installed in order to attain small size and excellent filter characteristics. As a reception device having an actively driven BPF, a technique is proposed in which, by widening the passband of the BPF if the reception intensity is strong, it is possible to reliably extract a desired reception channel even if the central frequency of the received signal has shifted from a prescribed frequency (see Japanese Patent Application Laid-Open Publication No. 2012-239016, for example).

SUMMARY OF THE INVENTION

However, in such BPFs, shifting of the central frequency of the passband or changes in filter characteristics sometimes occur due to variation in manufacturing and the like. As a result, there has been a problem that the data signal could not be demodulated with a high degree of accuracy from the reception signal.

The present invention provides a reception device and a method for adjusting a reception device by which it is possible to demodulate a data signal with a high degree of accuracy even if variations in manufacturing occur.

The invention is applied to a reception device for receiving a radio frequency (RF) signal and for obtaining a data signal from the RF signal in a desired reception channel, the reception device being operable in a normal mode and a test mode. The reception device includes a frequency conversion circuit configured to convert the RF signal to an intermediate frequency (IF) signal in the normal mode, a bandpass filter configured to bandpass-filter a signal input therein, including in the normal mode, to bandpass-filter the IF signal to obtain a selection IF signal, and in the test mode, to bandpass-filter a first test signal and a second test signal to respectively obtain bandpass-filtered first and second test signals, the first test signal being within a lower transition band of the bandpass filter and having a first frequency that is lower than a frequency of the desired reception channel by a first prescribed frequency, the second test signal being within a higher transition band of the bandpass filter and having a second frequency that is higher than the frequency of the desired reception channel by a second prescribed frequency, a test signal generator configured to generate first and second test signals in the test mode, a reception intensity detection circuit configured to detect a lower frequency signal intensity from the bandpass-filtered first test signal, and a higher frequency signal intensity from the bandpass-filtered second test signal in the test mode, and an adjustment control circuit configured to control the reception device to work in the normal mode or the test mode, and in the test mode, receive the lower frequency signal intensity and the higher frequency signal intensity, and adjust a central frequency of a passband of the bandpass filter using the received lower frequency signal intensity and the received higher frequency signal intensity, so as to reduce a difference between the central frequency of the passband and the frequency of the desired reception channel.

The invention is also applied to a reception device for receiving a radio frequency (RF) signal and for obtaining a data signal from the RF signal in a desired reception channel, the reception device being operable in a normal mode and a test mode. The reception device includes a frequency conversion circuit configured to convert the RF signal to an intermediate frequency (IF) signal in the normal mode, a test signal generator configured to generate a test signal, frequency of which changes over time within a passband of the bandpass filter in the test mode, a bandpass filter configured to bandpass-filter a signal input, including to bandpass-filter the IF signal to obtain a selection IF signal in the normal mode, and to bandpass-filter the test signal to obtain a bandpass-filtered test signal in the test mode, a phase detector configured to detect, in the test mode from the bandpass-filtered test signal, first to nth phases corresponding to first to nth frequencies within the passband of the bandpass filter, respectively, n being an integer of two or greater, and a demodulator configured to, in the normal mode, perform fast Fourier transform on the selection IF signal to obtain signal components corresponding to the first to nth frequencies within the passband of the bandpass filter, correct each of the signal components to generate corrected signal components, using differences between each of the first to nth phases of the bandpass-filtered test signal and each of first to nth reference phases, respectively, and demodulate the corrected signal components to generate the data signal.

Further, the invention is also applied to a reception method for adjusting a reception device configured to receive a radio frequency (RF) signal and to obtain a data signal from the RF signal in a desired reception channel, the reception device including a bandpass filter configured to bandpass-filter a signal input therein. The method includes inputting a first test signal and a second test signal to the bandpass filter, to obtain bandpass-filtered first and second test signals, respectively, the first test signal being within a lower transition band of the bandpass filter and having a first frequency that is lower than a frequency of the desired reception channel by a first prescribed frequency, the second test signal being within a higher transition band of the bandpass filter and having a second frequency that is higher than the frequency of the desired reception channel by a second prescribed frequency, detecting a lower frequency signal intensity and a higher frequency signal intensity from the bandpass-filtered first test signal and the bandpass-filtered second test signal, respectively, and adjusting a central frequency of the passband of the bandpass filter using the detected lower frequency signal intensity and the detected higher frequency signal intensity, so as to reduce a difference between the central frequency of the passband and the frequency of the desired reception channel.

Furthermore, the invention is also applied to a reception method of a reception device configured to receive a radio frequency (RF) signal and to obtain a data signal from the RF signal in a desired reception channel, the reception device being operable in a normal mode and a test mode and including a bandpass filter configured to bandpass-filter a signal input therein. The method includes in the test mode, inputting to the bandpass filter a test signal that has a frequency changing over time within a passband of the bandpass filter, to obtain a bandpass-filtered test signal, and detecting, from the bandpass-filtered test signal, first to nth phases corresponding to first to nth frequencies in the passband, respectively, n being an integer of two or greater, and in the normal mode, converting the RF signal to an intermediate frequency (IF) signal, inputting the IF signal to the bandpass filter, to obtain a selection IF signal, performing fast Fourier transform on the selection IF signal, to obtain signal components corresponding to the first to nth frequencies within the passband of the bandpass filter, correcting each of the signal components to obtain corrected signal components, using differences between the first to nth phases detected from the bandpass-filtered test signal and first to nth reference phases, respectively, and demodulating the corrected signal components to generate the data signal.

In the present invention, when supplying to the bandpass filter (BPF), which allows signals in the band of the desired reception channel to pass, the first test signal that is in the lower transition band of the BPF and that has a first frequency that is lower than the frequency of the desired reception frequency by a prescribed frequency value, the detected reception intensity is taken in as a lower frequency signal intensity. Additionally, when supplying to the BPF the second test signal that is in the higher transition band of the BPF and that has a second frequency that is higher than the frequency of the desired reception channel by a prescribed frequency value, the detected reception intensity is taken in as a higher frequency signal intensity. The actual central frequency of the BPF is adjusted on the basis of the difference between the lower frequency signal intensity and the higher frequency signal intensity.

According to the present invention, even if the central frequency of the passband of the BPF does not match the frequency of the communication channel as a result of manufacturing variations immediately after manufacturing is complete, the central frequency can be adjusted to match the frequency of the communication channel. In this manner, it is possible to acquire reliably the band components of the desired reception channel from the intermediate frequency signal, thereby enabling accurate demodulation of the data signal.

Also, in the present invention, first to nth phase information is acquired by detecting phases corresponding, respectively, to first to nth frequencies in the passband of the selection intermediate frequency signal obtained when a test signal in which the frequency changes over time within the passband of the BPF is supplied to the BPF. Then, a correction table in which the first to nth frequencies correspond to the first to nth phase information is generated. At this time, phase correction, based on the first to nth phase information corresponding to the first to nth frequencies indicated in the correction table, is performed on the frequency component data representing signal components of the respective first to nth frequencies, obtained by performing a fast Fourier transform process on the selection intermediate frequency signal in the demodulator.

Thus, according to the present invention, even if the group delay characteristics in the passband of the BPF are not flat due to variation in manufacturing, it is possible to convert the group delay characteristics to flat characteristics in the demodulator, enabling a reduction in the demodulation rate in the demodulator.

DETAILED DESCRIPTION OF THE INVENTION

Figure 1:
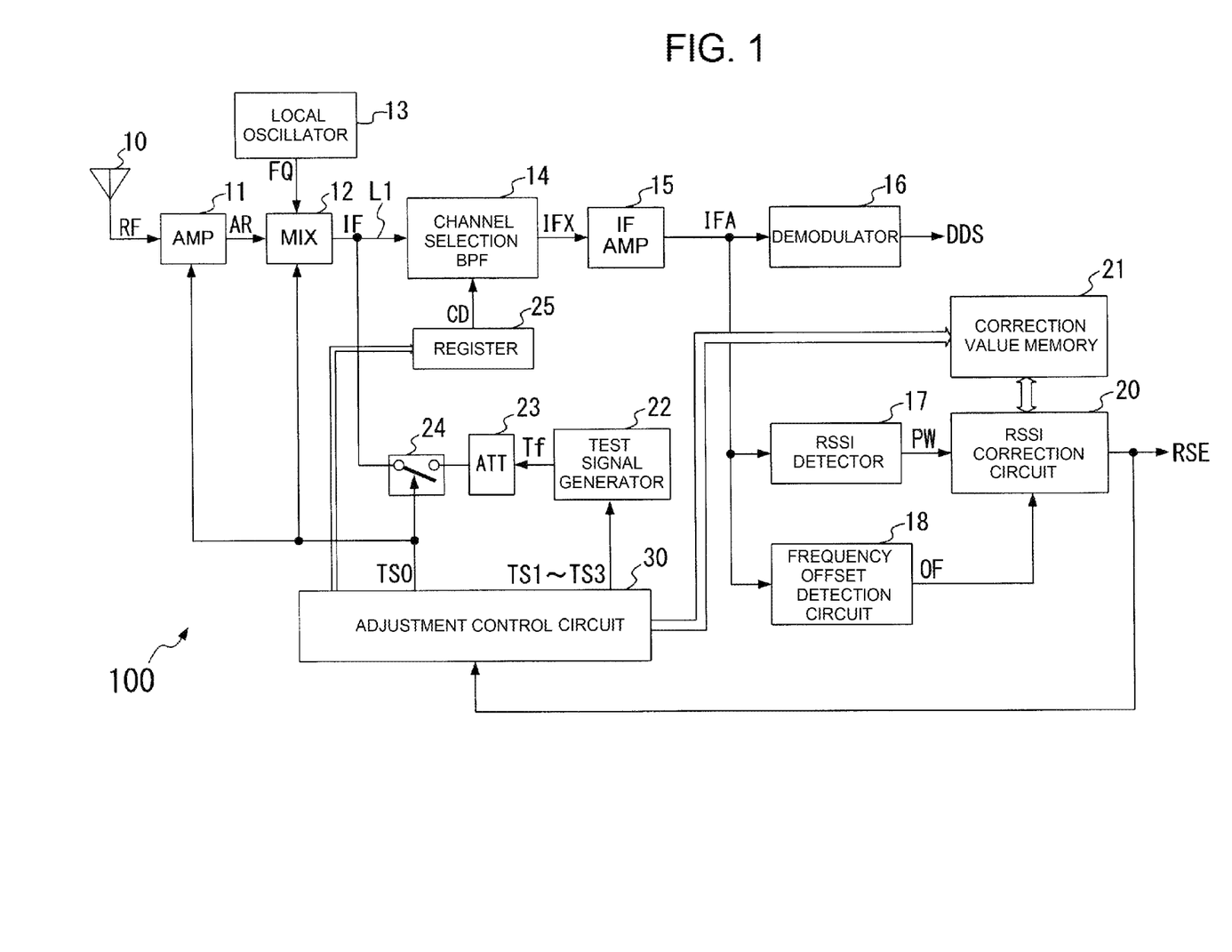
FIG. 1 is a block diagram that shows a configuration of a reception device according to an exemplary embodiment.

FIG. 1 is a block diagram that shows a configuration of a reception device 100 according to an exemplary embodiment of the invention. In FIG. 1, the transmission signal wirelessly transmitted from a transmission device (not shown) is received by an antenna 10. A radio frequency signal RF that has a high frequency received through the antenna 10 is supplied to an amplifier 11 as a low noise amplifier circuit. The high frequency signal RF is a signal modulated by frequency division multiplexing such as orthogonal frequency division multiplexing (OFDM), for example.

The amplifier 11 supplies a reception signal AR, which was obtained by amplifying the received high frequency signal RF, to a mixer 12.

The mixer 12 generates an intermediate frequency signal in an intermediate frequency band by mixing a local oscillation signal FQ supplied from a local oscillator 13 with the received reception signal AR in a normal mode, i.e., reception mode. The local oscillator 13 supplies the local oscillation signal FQ having a frequency corresponding to a desired reception channel to the mixer 12. In other words, the frequency conversion unit constituted of the mixer 12 and the local oscillator 13 converts the reception signal AR as the high frequency signal to the intermediate frequency signal IF in the intermediate frequency band. The mixer 12 supplies the intermediate frequency signal IF to a channel selection bandpass filter circuit 14 (hereinafter referred to as the "channel selection BPF") through a line L1.

While a test command signal TS0 having a logic value of 0 (also referred to below as "TS0_0"), for example, is being supplied, indicating that a test is not to be performed, the amplifier 11 and the mixer 12 perform the above-mentioned operation, but stop operating while a test command signal TS0 having a logic value of 1 (also referred to below as "TS0_1") is being supplied, indicating that a test is to be performed. That is, the reception device 100 is configured to operate in a normal mode while the test command signal TS0 having a logic value of 0, and operate in a test mode while the test command signal TS0 having a logic value of 1.

The channel selection BPF 14 supplies a selection intermediate frequency signal IFX, which is obtained by performing a filtering process on the intermediate frequency signal IF allowing through a band of a desired reception channel, to an intermediate frequency amplification circuit 15 (IF-AMP).

Figure 2:
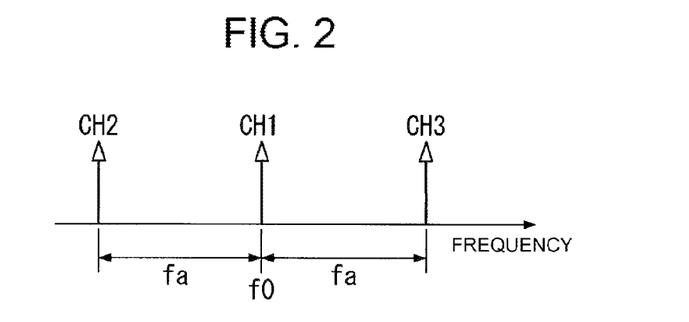
FIG. 2 shows a frequency difference fa between a communication channel CH1 for which reception is desired and communication channels CH2 and CH3 adjacent thereto according to an exemplary embodiment.
Figure 3:
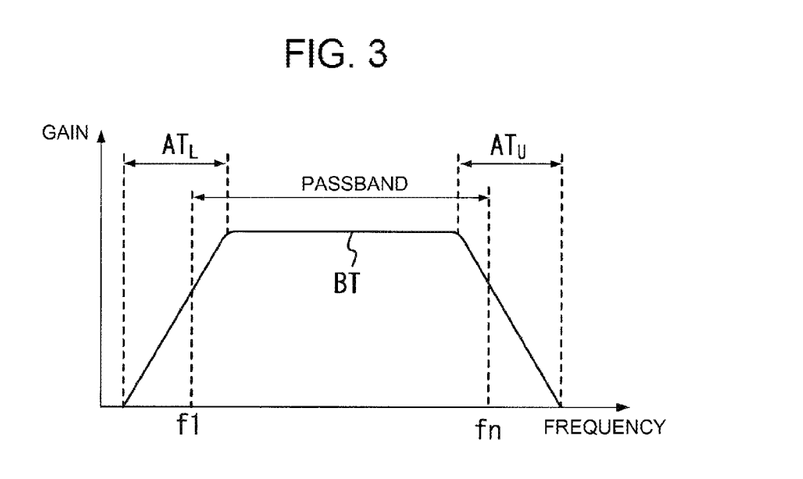
FIG. 3 shows a lower limit frequency f1 and an upper limit frequency fn of a passband in bandpass characteristics BT of a channel selection BPF according to an exemplary embodiment.

FIG. 2 shows a frequency difference fa between the communication channel CH1 and communication channels CH2 and CH3 adjacent thereto when the desired reception channel is the communication channel CH1. FIG. 3 shows bandpass characteristics BT of the channel selection BPF 14. The communication channel CH1 is a user's desired channel which the user can set to the reception device.

The channel selection BPF 14 sets a central frequency of a passband in which the desired reception channel is allowed through as the central frequency set in central frequency indication data CD stored in a register 25.

The intermediate frequency amplification circuit 15 supplies a selection intermediate frequency signal IFA obtained by amplifying the selection intermediate frequency signal IFX to the demodulator 16, a received signal strength indication (RSSI) detector 17, and a frequency offset detector 18.

The demodulator 16 performs a demodulation process on the selection intermediate frequency signal IFA, thereby recovering information data or voice data that has been wirelessly transmitted, and outputs a demodulated data signal DDS representing the information or voice data.

The RSSI detector 17 detects the reception intensity on the basis of the selection intermediate frequency signal IFA and supplies a reception intensity signal PW indicating this reception intensity to an RSSI correction circuit 20.

The frequency offset detector 18 detects as a frequency offset the frequency difference between the frequency attained by performing frequency detection on the selection intermediate frequency signal IFA and the frequency f0 of the communication channel CH1 for which reception is desired, shown in FIG. 2. In other words, the frequency offset detector 18 detects as the frequency offset the offset in frequency of the selection intermediate frequency signal IFA relative to the frequency f0 of the communication channel for which reception is desired. The frequency f0 is a frequency of the communication channel CH1. The frequency offset detector 18 supplies a frequency offset signal OF indicating frequency offset to the RSSI correction circuit 20.

The RSSI correction circuit 20 first determines the frequency of the intermediate frequency signal IF on the basis of the frequency offset represented by the frequency offset signal OF. Next, the RSSI correction circuit 20 obtains a correction value corresponding to the frequency of the intermediate frequency signal IF from a correction table written to a correction value memory 21. The RSSI correction circuit 20 outputs a reception intensity signal RSE indicating the reception intensity obtained by correcting the reception intensity represented by the reception intensity signal PW using this correction value. In other words, the RSSI correction circuit 20 outputs a reception intensity signal RSE indicating a value obtained by adding or subtracting the correction value to/from the reception intensity represented by the reception intensity signal PW.

A frequency detector that directly detects the frequency of the selection intermediate frequency signal IFA may be used as the frequency offset detector 18. At this time, the RSSI correction circuit 20 may obtain a correction value corresponding to the frequency detected by the frequency detector from a correction table written to a correction value memory 21.

As an initial correction table, the correction value memory 21 stores in advance a correspondence between an initial correction value and a reception intensity for each frequency in the range of frequencies between adjacent channels. The initial correction table stores correspondences between the initial correction value for correcting the reception intensity and each frequency in the range of frequencies that can actually be obtained as intermediate frequency signals IF.

A test signal generator 22 is configured to generate a test signal Tf according to a corresponding one of test command signals TS1, TS2, and TS3 at a logic value of 1, for example, indicating that a test should be executed. The test signal generator 22 is a test signal generation circuit, for example. In other words, in accordance with the test command signal TS1, the test signal generator 22 generates a first test signal Tf (also referred to below as "Tf_1") having a first frequency (f0−fa) in which a frequency difference fa with adjacent communication channels is subtracted from the frequency f0 of the communication channel CH1 for which reception is desired as shown in FIG. 2. The first frequency (f0−fa) of the first test signal Tf_1 is hereinafter referred to as a lower frequency. Also, in accordance with the test command signal TS2, the test signal generator 22 generates a second test signal Tf (also referred to below as "Tf_2") having a second frequency (f0+fa) in which the frequency difference fa is added to the frequency f0. The second frequency (f0+fa) of the second test signal Tf_2 is hereinafter referred to as a higher frequency.

Additionally, in accordance with the test command signal TS3, the test signal generator 22 generates, as a third test signal Tf (also referred to below as "Tf_3"), a sweep signal in which the frequency changes over time from the lower limit frequency f1 of the passband as in the bandpass characteristics BT of the channel selection BPF 14 shown in FIG. 3 towards the upper limit frequency fn.

Figure 4:
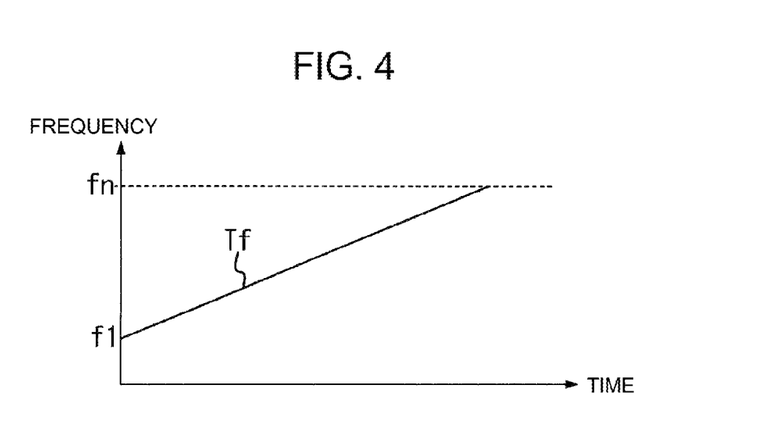
FIG. 4 is a waveform showing a test signal Tf according to an exemplary embodiment.

FIG. 4 shows an example of the third test signal Tf (Tf_3) as a sweep signal in which the frequency changes over time from the frequency f1 towards the frequency fn.

The test signal generator 22 generates the first to third test signals Tf (Tf_1, Tf_2, Tf_3) in synchronization with a reference clock signal used in the reception device 100, and supplies these to an attenuator 23.

The attenuator 23 supplies the test signals attained by adjusting the signal levels of the test signals Tf to a switch 24.

While a test command signal TS0 having a logic value of 0 is being supplied, indicating that a test is not to be performed, the switch 24 is off (the OFF state), but while a test command signal TS0 (TS0_1) having a logic value of 1 is being supplied, indicating that a test is to be performed, the switch 24 is on (the ON state). Only while the switch 24 is on, the test signal Tf, on which the attenuator 23 has performed level adjustment, is supplied the channel selection BPF 14 through the switch 24 and the line L1 only while the switch 24 is on.

The register 25 stores the central frequency indication data CD indicating the central frequency in the band allowing through the desired reception channel, and supplies the central frequency indication data CD to the channel selection BPF 14.

Figure 5:
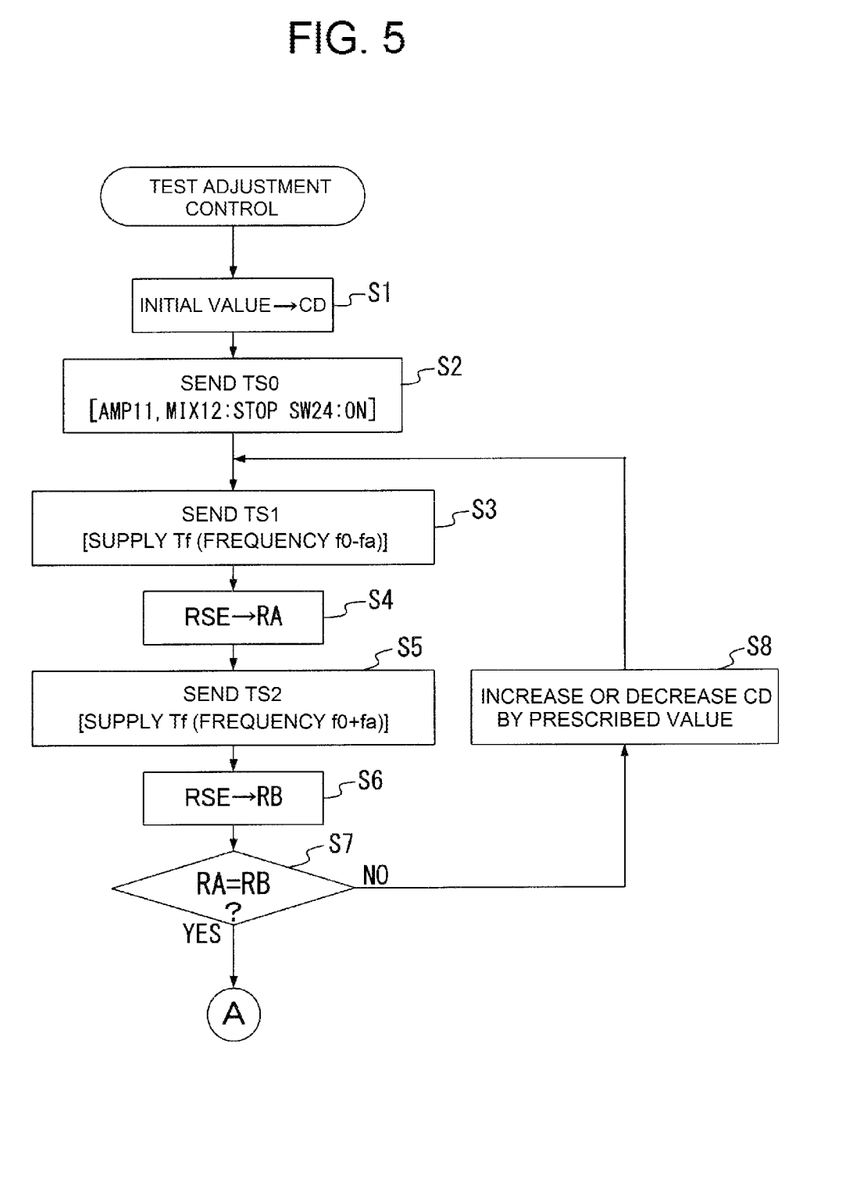
FIG. 5 is a flow chart showing adjustment control according to an exemplary embodiment.
Figure 6:
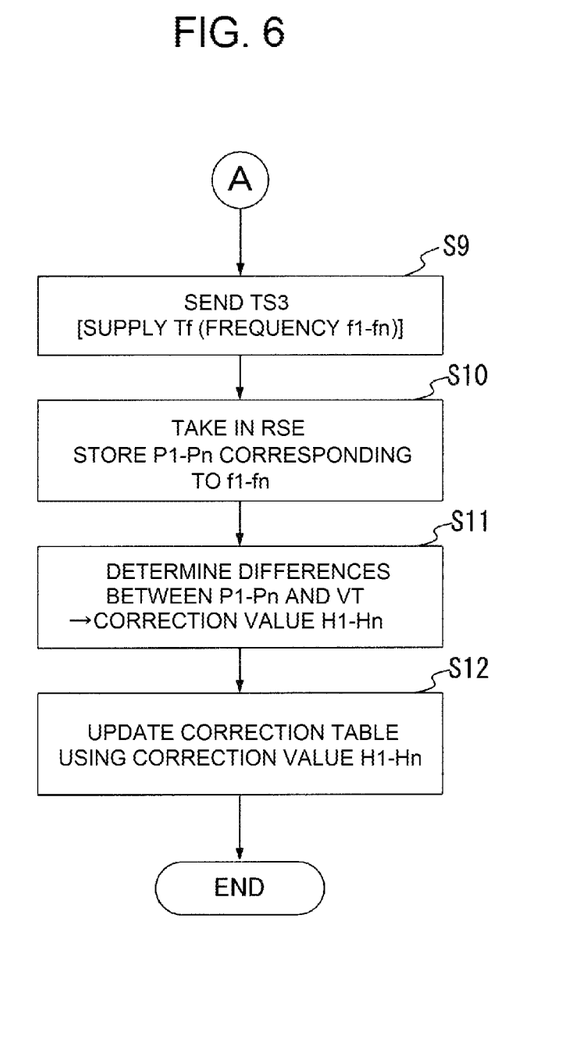
FIG. 6 is a flow chart showing adjustment control an exemplary embodiment.

An adjustment control circuit 30 performs the adjustment control shown in FIGS. 5 and 6 in accordance with a test command TCM supplied through a central processing unit (CPU) (not shown), which controls the entire system including the reception device 100, or through an external terminal.

First, the adjustment control circuit 30 writes the central frequency indication data CD, indicating the initial value of the central frequency, to the register 25 (step S1).

Next, the adjustment control circuit 30 supplies the test command signal TS0, indicating that a test is to be performed, to the amplifier 11, the mixer 12, and the switch 24 (step S2). As a result of step S2 being performed, the operation of the amplifier 11 and the mixer 12 is halted and the switch 24 turns on.

Next, the adjustment control circuit 30 supplies to the test signal generator 22 the test command signal TS1 for generating the first test signal Tf (Tf_1) (step S3).

By performing step S3, the test signal generator 22 generates the first test signal Tf_1 having the lower frequency (f0−fa) in which the frequency difference fa between the communication channels is subtracted from the frequency f0 shown in FIG. 2. The first test signal Tf_1 is supplied to the channel selection BPF 14 through the attenuator 23, the switch 24, and the line L1. In this manner, the channel selection BPF 14 obtains the selection intermediate frequency signal IFX by performing, on the first test signal Tf_1 having the lower frequency (f0−fa), a filtering process based on the bandpass characteristics BT shown in FIG. 3. The selection intermediate frequency signal IFX obtained by the channel selection BPF 14 by supplying the first test signal Tf_1 is also referred to as a bandpass-filtered first test signal. The RSSI detector 17 supplies the reception intensity signal PW indicating the current reception intensity to an RSSI correction circuit 20 on the basis of the selection intermediate frequency signal IFA obtained by amplifying the selection intermediate frequency signal IFX. The RSSI correction circuit 20 outputs the reception intensity signal RSE obtained by correcting the value of the reception intensity signal PW on the basis of the correction table stored in the correction value memory 21.

Next, the adjustment control circuit 30 takes in the reception intensity signal RSE and stores this in an internal register (not shown) as a lower frequency signal intensity RA (step S4).

Next, the adjustment control circuit 30 supplies to the test signal generator 22 the test command signal TS2 for generating the second test signal Tf (Tf_2) (step S5).

By performing step S5, the test signal generator 22 generates the second test signal Tf_2 having the higher frequency (f0+fa) in which the frequency difference fa between the communication channels is added to the frequency f0 shown in FIG. 2. The second test signal Tf_2 is supplied to the channel selection BPF 14 through the attenuator 23, the switch 24, and the line L1. In this manner, the channel selection BPF 14 obtains the selection intermediate frequency signal IFX by performing, on the second test signal Tf_2 having a higher frequency (f0+fa), a filtering process based on the bandpass characteristics BT shown in FIG. 3. The selection intermediate frequency signal IFX obtained by the channel selection BPF 14 by supplying the second test signal Tf_2 is also referred to as a bandpass-filtered second test signal. The RSSI detector 17 supplies the reception intensity signal PW indicating the current reception intensity to an RSSI correction circuit 20 on the basis of the selection intermediate frequency signal IFA obtained by amplifying the selection intermediate frequency signal IFX. The RSSI correction circuit 20 outputs the reception intensity signal RSE obtained by correcting the value of the reception intensity signal PW on the basis of the correction table stored in the correction value memory 21.

Next, the adjustment control circuit 30 takes in the reception intensity signal RSE and stores this in an internal register as a higher frequency signal intensity RB (step S6).

Next, the adjustment control circuit 30 determines whether or not the lower frequency signal intensity RA matches the higher frequency signal intensity RB (step S7).

If it is determined in step S7 that these values do not match, then the adjustment control circuit 30 increases or decreases the central frequency value indicated by the central frequency indication data CD stored in the register 25 by a prescribed value (step S8).

After performing step S8, the adjustment control circuit 30 returns to step S3, and repeats steps S3 to S8 until it is determined in step S7 that the lower frequency signal intensity RA matches the higher frequency signal intensity RB.

During this time, if the lower frequency signal intensity RA does not match the higher frequency signal intensity RB, this signifies that the frequency f0 of the communication channel CH1 for which reception is desired does not match the central frequency of the passband based on the bandpass characteristics BT of the channel selection BPF 14.

Figure 7:
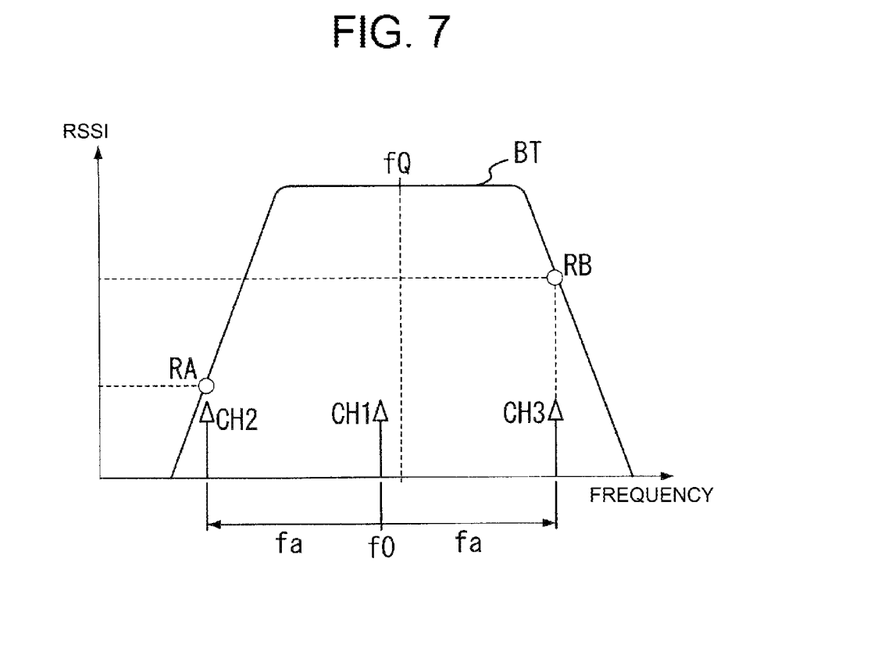
FIG. 7 shows an example of bandpass characteristics BT for a case in which there is an offset between the central frequency fQ of the passband of the channel selection BPF, and the frequency f0 of the communication channel CH1 according to an exemplary embodiment.

FIG. 7 shows an example of bandpass characteristics BT for a case in which there is an offset between the central frequency fQ, which is the central frequency of the passband of the channel selection BPF 14, and the frequency f0 of the communication channel CH1.

In order to cause the frequency f0 to match the central frequency fQ, the adjustment control circuit 30 increases or decreases the value of the central frequency indicated by the central frequency indication data CD by a prescribed value by performing step S8. In this manner, the bandpass characteristics BT of the channel selection BPF 14 are adjusted such that the central frequency fQ of the channel selection BPF 14 matches the frequency f0 of the communication channel CH1.

If the lower frequency signal intensity RA matches the higher frequency signal intensity RB, this signifies that the central frequency fQ of the channel selection BPF 14 matches the frequency f0 of the communication channel CH1.

Figure 8:
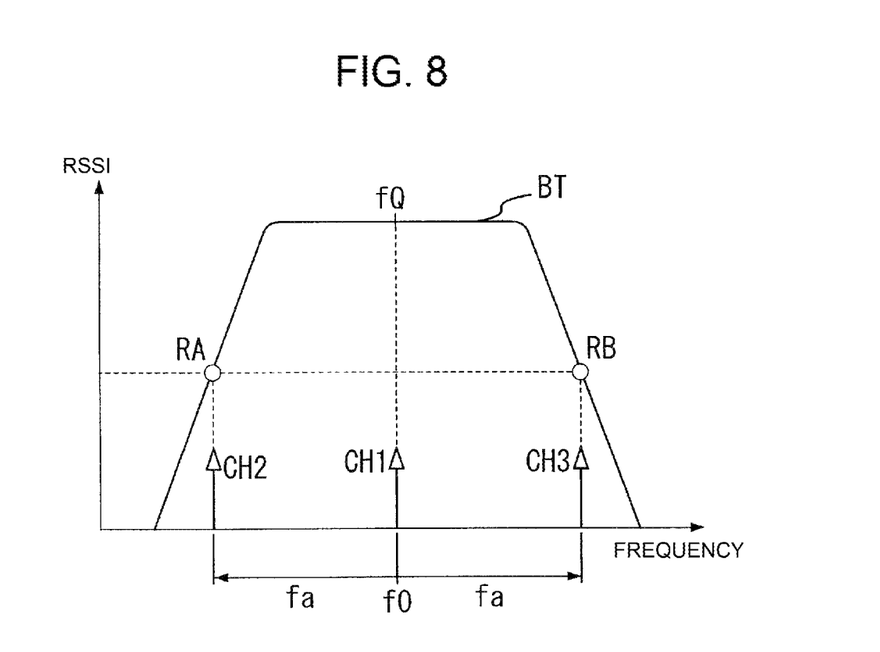
FIG. 8 shows bandpass characteristics BT for a case in which the central frequency fQ of the passband of the channel selection BPF is equal to the frequency f0 of the communication channel CH1 according to an exemplary embodiment.

FIG. 8 shows bandpass characteristics BT for a case in which the central frequency fQ of the passband of the channel selection BPF 14 matches the frequency f0 of the communication channel CH1.

Thus, even if the central frequency of the passband of the channel selection BPF 14 does not match the frequency of the communication channel as a result of manufacturing variations, the central frequency can be adjusted to match the frequency of the communication channel by adjusting the bandpass characteristics BT in steps S1 to S8. Thus, after such adjustment, the channel selection BPF 14 can obtain with a high degree of accuracy band components of the desired reception channel from the intermediate frequency signal. In this manner, it is possible to demodulate the data signal with a high degree of accuracy.

After adjustment of the bandpass characteristics BT by steps S1 to S8 shown in FIG. 5, the adjustment control circuit 30 can adjust the correction value for the reception intensity by continuing to perform steps S9 to S12 below.

First, the adjustment control circuit 30 supplies to the test signal generator 22 the test command signal TS3 for generating the third test signal Tf (Tf_3) (step S9).

By performing step S9, as shown in FIG. 4, the test signal generator 22 generates the third test signal Tf_3 in which the frequency thereof increases over time from the lower limit frequency f1 of the passband of the channel selection BPF 14 towards the upper limit frequency fn. The third test signal Tf_3 is supplied to the channel selection BPF 14 through the attenuator 23, the switch 24, and the line L1. In this manner, the channel selection BPF 14 obtains the selection intermediate frequency signal IFX by performing, on the third test signal Tf_3 having a frequency that changes over time as shown in FIG. 4, a filtering process on the basis of the bandpass characteristics BT shown in FIG. 8. The selection intermediate frequency signal IFX obtained by the channel selection BPF 14 by supplying the third test signal Tf_3 is also referred to as a bandpass-filtered third test signal. The RSSI detector 17 supplies the reception intensity signal PW indicating the reception intensities to an RSSI correction circuit 20 on the basis of the selection intermediate frequency signal IFA obtained by amplifying the selection intermediate frequency signal IFX. In other words, the RSSI detector 17 supplies to the RSSI correction circuit 20 the reception intensity signal PW corresponding to each frequency in the range of the frequencies f1 to fn shown in FIG. 4. The RSSI detector 17 is a reception intensity detection circuit, for example. The RSSI detector 17 detects the reception intensities from the selection intermediate frequency signal IFX in the normal mode, and detects signal intensities from the first to third bandpass-filtered test signals in the test mode. The RSSI correction circuit 20 outputs the reception intensity signal RSE obtained by correcting the value of the reception intensity signal PW corresponding to each frequency in the range of the frequencies f1 to fn on the basis of the correction table stored in the correction value memory 21.

Figure 9:
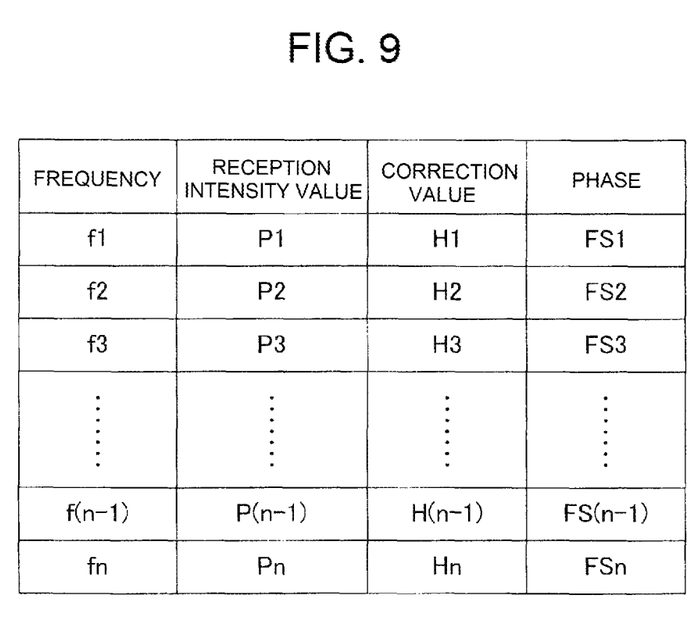
FIG. 9 shows a correction table according to an exemplary embodiment.

Next, the adjustment control circuit 30 takes in the reception intensity signal RSE and stores, in an internal register, each reception intensity corresponding to each frequency in the n system (n being an integer of 2 or greater) in the range of frequencies f1 to fn indicated by the reception intensity signal RSE, as reception intensity P1 to Pn corresponding to the respective frequencies as shown in FIG. 9 (step S10).

Next, the adjustment control circuit 30 determines the differences between the series of reception intensities corresponding to the frequencies f1 to fn and a series V2 of preset reference intensities corresponding to the respective frequencies f1 to fn for the same frequencies, and obtains the group of differences determined for the respective frequencies as correction values H1 to Hn (step S11).

Figure 10:
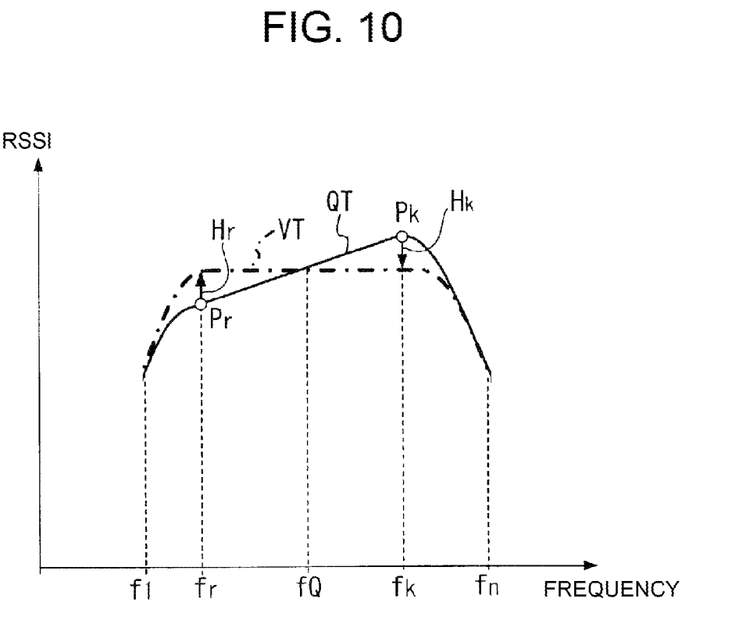
FIG. 10 shows an example of a series QT of reception intensities P1 to Pn, a series VT of reference intensities, and a correction value H according to an exemplary embodiment.

As shown in FIG. 10, for example, if the series of reception intensities P1 to Pn actually obtained is a series QT depicted with a solid line in contrast to the series VT of reference intensities (depicted with a one-dot-chain line) corresponding to the respective frequencies f1 to fn, then this indicates that the reception intensity Pr corresponding to the frequency fr is less than the reference intensity corresponding to the frequency fr. In this case, the adjustment control circuit 30 obtains a correction value Hr to increase the reception intensity corresponding to the frequency fr by an amount corresponding to the difference between the reference intensity corresponding to the frequency fr and the reception intensity Pr corresponding to the frequency fr. As shown in FIG. 10, if a reception intensity Pk corresponding to a frequency fk is greater than the reference intensity corresponding to the frequency fk, then the adjustment control circuit 30 obtains a correction value Hk to decrease the reception intensity corresponding to the frequency fk by an amount corresponding to the difference between the reference intensity and the reception intensity Pk.

Next, the adjustment control circuit 30 generates a correction table indicating correction values H1 to Hn corresponding to the respective frequencies in the n system in the range of frequencies f1 to fn, and updates the correction table already in the correction value memory 21, thereby updating the correction table (step S12).

In this manner, when performing adjustment (S9 to S12) of correction values corresponding to the reception intensities, first, the test command signal TS3 is sent to the test signal generator 22, thereby supplying to the channel selection BPF 14 the third test signal Tf_3, which is a sweep signal in the range of frequencies f1 to fn as shown in FIG. 4 (S9). Next, as shown in FIGS. 9 and 10, reception intensity characteristics QT constituted of the series of reception intensities P1 to Pn corresponding to the frequencies f1 to fn are measured on the basis of the selection intermediate frequency signal IFX outputted from the channel selection BPF 14 (S10). Next, as shown in FIG. 10, the difference between the reception intensity for each frequency shown in the reception intensity characteristics QT and the reception intensity for each frequency shown in the reference intensity characteristics VT is calculated for the same frequencies, and the respective differences are obtained as correction values H1 to Hn to correct the intensities to the reference intensity characteristics VT (S11). The correction table indicating the correction values H1 to Hn corresponding to the respective frequencies f1 to fn is overwritten in the correction value memory 21 (S12).

The RSSI correction circuit 20 reads the correction values corresponding to the frequencies that correspond to the frequency offset signals OF from the correction table in the correction value memory 21, and the reception intensity indicated by the reception intensity signal PW is increased or decreased by the correction value. In other words, the RSSI correction circuit 20 corrects the reception intensity indicated by the reception intensity signal PW using the correction value. The RSSI correction circuit 20 outputs the reception intensity signal RSE indicating the reception intensity after this correction. In other words, the RSSI correction circuit 20 assumes flat gain characteristics based on the reference intensity characteristics as gain characteristics in the passband of the channel selection BPF 14, and determines the reception intensities obtained according to the gain characteristics by the correction process.

Figure 11:
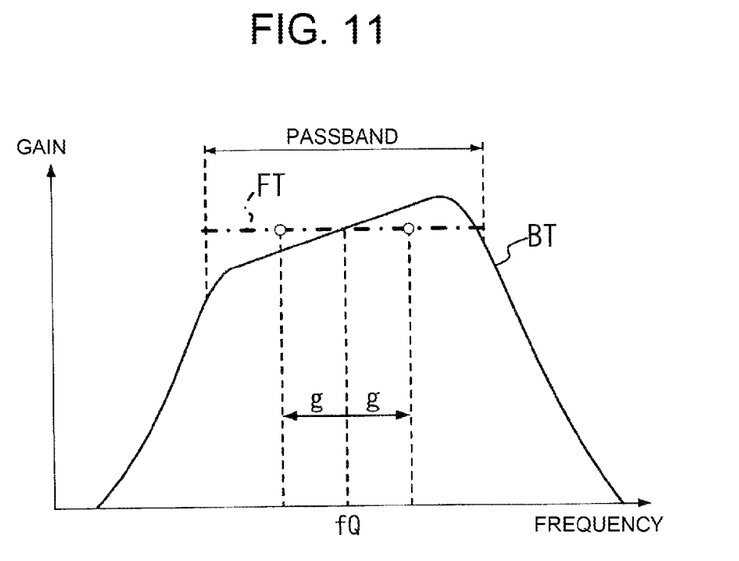
FIG. 11 shows an example of bandpass characteristics BT for a case in which gain deviation has occurred in the passband of the channel selection BPF according to an exemplary embodiment.

FIG. 11 shows an example of bandpass characteristics BT for a case in which gain deviation has occurred in the passband of the channel selection BPF 14. In this case, as shown in FIG. 11, the RSSI correction circuit 20 assumes flat gain characteristics FT (one-dot-chain line) based on the reference intensity characteristics VT as gain characteristics in the passband of the bandpass characteristics BT of the channel selection BPF 14, and determines the reception intensities obtained according to the gain characteristics FT by the correction process.

Thus, as shown in FIG. 11, by the correction performed on the reception intensity signal PW by the RSSI correction circuit 20, even if the gain in the passband of the channel selection BPF 14 is not uniform and the frequency of the intermediate frequency signal IF is offset by a margin of error g from the central frequency fQ of the passband, it is possible to obtain a reception intensity signal RSE indicating the actual reception intensities (shown as white circles).

In the test signal generator 22, the test signal Tf is generated on the basis of the reference clock signal used in the reception device 100, but a configuration may be adopted in which a phase locked loop (PLL) circuit is provided in the test signal generator 22 and the test signal Tf is generated on the basis of the clock signal generated by the PLL circuit. Also, the test signal generator 22 may generate the test signal Tf on the basis of the local oscillation signal FQ generated by the local oscillator 13.

Additionally, in the test signal generator 22, according to the test command signals TS1 and TS2, the first test signal Tf_1 having a lower frequency (f0−fa) in a channel adjacent to and having a lower frequency than a desired reception channel, and a second test signal Tf_2 having a higher frequency (f0+fa) in a channel adjacent to and having a higher frequency than the desired reception channel are generated. However, the frequencies of the first and second test signals Tf generated according to the test command signals TS1 and TS2 are not limited to (f0−fa) and (f0+fa). The frequency of the first test signal Tf_1 generated by the test signal generator 22 according to the test command signal TS1 need only satisfy being within the transition band of a lower frequency side $AT_L$ to the lower side of the bandpass characteristics BT of the channel selection BPF 14 such as shown in FIG. 3, and being a lower frequency that is lower than the frequency f0 of the desired reception channel by a prescribed frequency. Also, the frequency of the second test signal Tf_2 generated by the test signal generator 22 according to the test command signal TS2 need only satisfy being within the transition band of a higher frequency side $AT_U$ to the upper side of the bandpass characteristics BT of the channel selection BPF 14 such as shown in FIG. 3, and being a higher frequency that is higher than the frequency f0 of the desired reception channel by a prescribed frequency. The transition band of the lower frequency side $AT_L$ is also referred to as a lower attenuation region. The transition band of the higher frequency side $AT_U$ is also referred to as a higher attenuation region.

Additionally, the test signal generator 22 generates a sweeping third test signal Tf_3 that sweeps from the lower limit frequency f1 towards the upper limit frequency fn of the passband of the channel selection BPF 14 according to the test command signal TS3, but the range of frequencies over which the test signal Tf_3 sweeps is not limited to the frequencies f1 to fn. In other words, the range of frequencies over which the third test signal Tf_3 sweeps need only be within the range of a prescribed low frequency to a prescribed high frequency in the passband of the channel selection BPF 14.

In the adjustment control circuit 30, in steps S7 and S8, the value of the central frequency indicated by the central frequency indication data CD is increased or decreased in a stepwise fashion until a lower frequency signal intensity RA matches a higher frequency signal intensity signal RB, that is, the difference therebetween is zero. However, the adjustment control circuit 30 may be configured so as to modify the value of the central frequency indicated by the central frequency indication data CD by an amount corresponding to the difference between the lower frequency signal intensity RA and the higher frequency signal intensity RB. In other words, in steps S7 and S8, the adjustment control circuit 30 need only adjust the central frequency of the passband of the channel selection BPF on the basis of the difference between the lower frequency signal intensity RA and the higher frequency signal intensity RB.

The reception device 100 need only include the frequency conversion units (12, 13), the BPF (14), the reception intensity detector (17), the frequency detector (18), the reception intensity correction unit (20), the test signal generation units (22-24), and the adjustment control circuit (30) described below. In other words, the frequency conversion unit converts the received high frequency signal (RF, AR) to an intermediate frequency signal (IF). The BPF obtains band components of the desired reception channel in the intermediate frequency signal as the selection intermediate frequency signal (IFX). The reception intensity detector detects the reception intensity (PW) on the basis of the selection intermediate frequency signal. The frequency detector detects the frequency of the selection intermediate frequency signal (IFX, IFA). The test signal generator sequentially supplies to the BPF a first test signal having a lower frequency that is within the lower attenuation region ($AT_L$) of the BPF and that is lower by a prescribed frequency value than the frequency (f0) of the desired reception channel, and a second test signal having a higher frequency that is within the higher attenuation region ($AT_U$) of the BPF and that is higher by a prescribed frequency value than the frequency of the desired reception channel. When the first test signal is supplied to the BPF, the adjustment control circuit takes in the reception intensity detected by the reception intensity detector as a lower frequency signal intensity (RA), and when the second test signal is supplied to the BPF, the adjustment control circuit takes in the reception intensity detected by the reception intensity detector as the higher frequency signal intensity (RB). The central frequency of the BPF is adjusted on the basis of the difference between the lower frequency signal intensity and the higher frequency signal intensity.

The test signal generator supplies to the BPF the third test signal in which the frequency changes over time within the passband of the BPF. The reception intensity detector detects first to nth signal intensities (P1 to Pn) corresponding, respectively, to the first to nth frequencies (f1 to fn) in the passband on the basis of the selection intermediate frequency signal obtained when the third test signal is supplied to the BPF. The adjustment control circuit determines the differences between the first to nth signal intensities and reference intensities as the first to nth correction values (H1 to Hn), and generates a correction table in which the first to nth frequencies correspond to the first to nth correction values. The reception intensity correction circuit corrects the reception intensities detected from a bandpass-filtered intermediate frequency signal by the reception intensity detector using the correction values, among the first to nth correction values in the correction table, placed in correspondence with the frequencies detected by frequency detector.

Here, if the demodulator 16 shown in FIG. 1 is a demodulator for a reception signal modulated by frequency division multiplexing such as OFDM, then a table representing phases for each frequency (f1−fn) may be created on the basis of the test signal Tf, and on the basis of the table, phase correction may be performed on the output from a fast Fourier transform (FFT) circuit in the demodulator 16.

Figure 12:
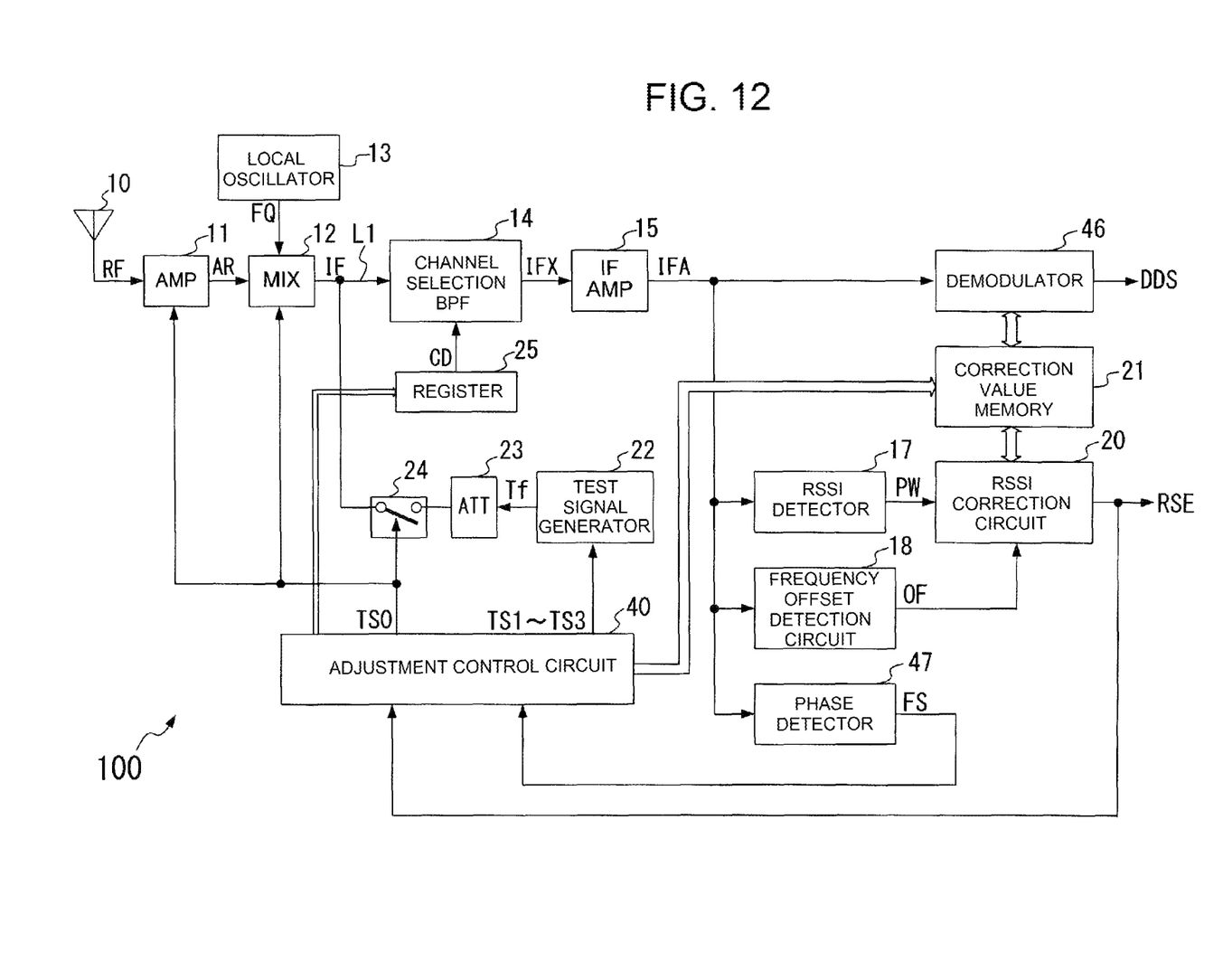
FIG. 12 is a block diagram showing a configuration of another reception device according to an exemplary embodiment.

FIG. 12 is a block diagram that shows another configuration of the reception device 100 taking into consideration these points. The configuration of FIG. 12 is the same as that of FIG. 1 besides the fact that an adjustment control circuit 40 is used instead of the adjustment control circuit 30, a demodulator 46 is used instead of the demodulator 16, and a phase detector 47 is newly provided.

In FIG. 12, the phase detector 47 detects the phases of the selection intermediate frequency signal IFA and supplies to the adjustment control circuit 40 a phase signal FS indicating these phases.

The adjustment control circuit 40 performs the adjustment control shown in FIGS. 5 and 6, similar to the adjustment control circuit 30. At this time, the operation performed during adjustment control is the same as what was mentioned above. However, in the configuration shown in FIG. 12, when the test signal Tf is supplied to the channel selection BPF 14 by the execution of step S9 shown in FIG. 6, the phase detector 47 supplies to the adjustment control circuit 40 phase information FS1, FS2, FS3, . . . , FSn indicating the phases of the frequencies f1, f2, f3, . . . , fn of the test signal Tf as shown in FIG. 4. The phase information indicates whether the phase is ahead of time or delayed with respect to a prescribed reference phase. The adjustment control circuit 40 creates a frequency-to-phase table FSD in which the frequencies f1 to fn correspond to the phase information FS1 to FSn as shown in FIG. 9, and this table is written to the correction value memory 21.

Figure 13:
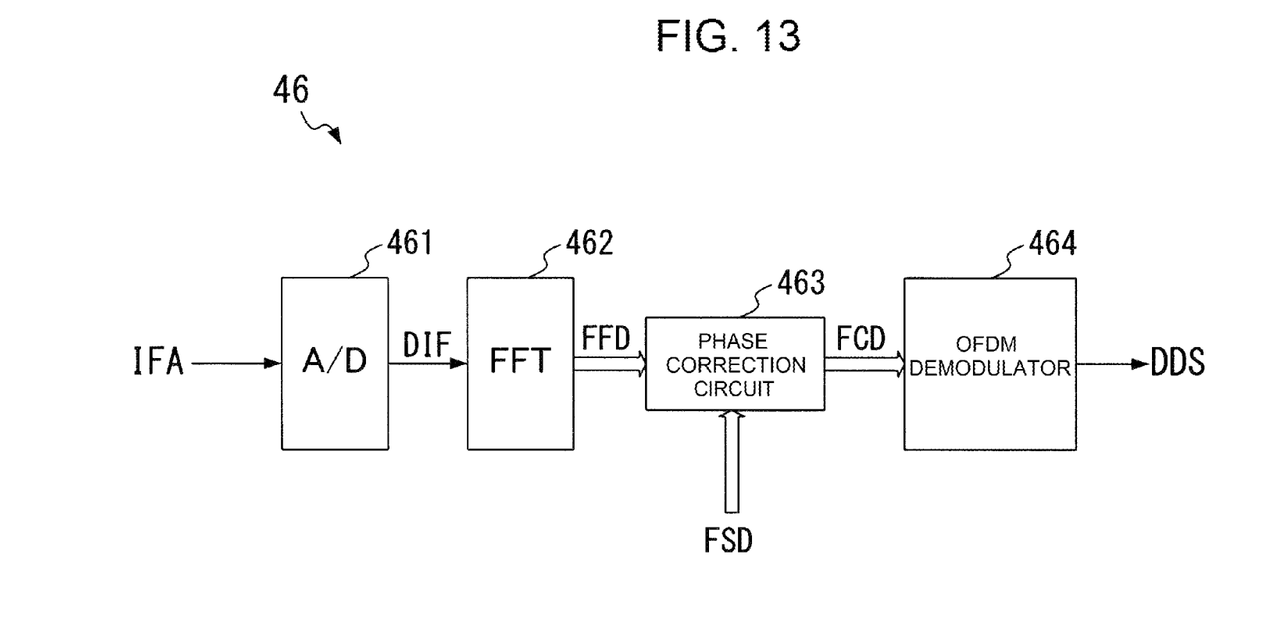
FIG. 13 is a block diagram showing an internal configuration of a demodulator according to an exemplary embodiment.

The demodulator 46 has the internal configuration shown in FIG. 13, for example. In FIG. 13, an A/D converter 461 supplies intermediate frequency data DIF, which is obtained by converting the analog selection intermediate frequency signal IFA to a digital value, to an FFT circuit 462.

The FFT circuit 462 supplies to a phase correction circuit 463 frequency component data FFD indicating the signal components of the respective frequencies (f1–fn) obtained by performing a fast Fourier transform process on the intermediate frequency data DIF.

The phase correction circuit 463 first reads the frequency-to-phase table FSD stored in the correction value memory 21. Then, the phase correction circuit 463 performs phase correction, on the basis of phase information FS corresponding to each frequency indicated in the frequency-to-phase table FSD, on each signal component of each frequency f1 to fn in the frequency component data FFD. If the phase information FS1 corresponding to the frequency f1 indicates an ahead of time phase W, for example, the phase correction circuit 463 performs correction on the signal component corresponding to the frequency f1 indicated by the frequency component data FFD so as to delay the phase by the phase W. If the phase information FS2 corresponding to the frequency f2 indicates a delayed time phase Y, for example, the phase correction circuit 463 performs correction on the signal component corresponding to the frequency f2 indicated by the frequency component data FFD so as to move the phase ahead in time by the phase Y.

The phase correction circuit 463 supplies to an OFDM demodulator (OFDM demodulation circuit) 464 correction frequency component data FCD obtained by performing the phase correction such as what was described above on each frequency component in the frequency component data FFD. The OFDM demodulator 464 outputs the demodulated data signal DDS obtained by performing an OFDM demodulation process on the correction frequency component data FCD.

The reception device 100 shown in FIG. 12 includes the frequency conversion unit (12, 13), the BPF (14), the demodulator (46), the test signal generator (22-24), the phase detector (47), and the adjustment control circuit (40) described below. In other words, the frequency conversion unit converts the received high frequency signal (RF, AR) to an intermediate frequency signal (IF). The BPF obtains band components of the desired reception channel in the intermediate frequency signal as the selection intermediate frequency signal (IFX) in the normal mode. The test signal generator supplies to the BPF the test signal in which the frequency changes over time in a frequency range within the passband of the BPF, and the BPF outputs a bandpass-filtered test signal. The phase detector detects phases corresponding, respectively, to the first to nth frequencies (f1 to fn) in the passband in the bandpass-filtered test signal obtained when the test signal is supplied to the BPF, and obtains first to nth phase information (FS1–FSn). The adjustment control circuit generates a correction table in which the first to nth frequencies correspond to the first to nth phase information. The demodulator obtains frequency component data (FFD) indicating signal components at each frequency obtained by performing a fast Fourier transform process on the selection intermediate frequency signal, and performs a demodulation process on this frequency component data to obtain the demodulated data signal (DDS), as a data signal. At this time, the demodulator is provided with a phase correction circuit that performs phase correction based on the first to nth phase information corresponding to the first to nth frequencies indicated in the above-mentioned correction table on the signal components corresponding to the first to nth frequencies in the frequency component data.

Figure 14:
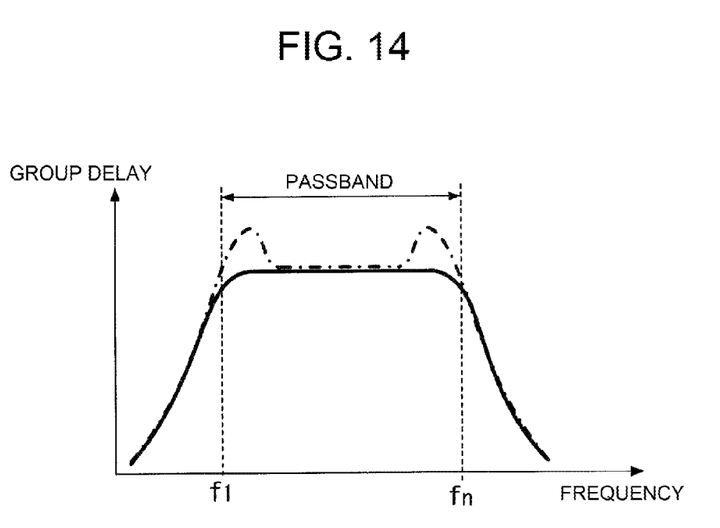
FIG. 14 shows group delay characteristics in the passband of the channel selection BPF according to an exemplary embodiment.

As a result, according to the configuration of FIGS. 12 and 13, even if the group delay characteristics in the passband of the channel selection BPF 14 are not flat as depicted with the one-dot-chain line of FIG. 14, the group delay characteristics can be converted to a flat shape in the demodulator 46. In this manner, the demodulation error rate in the OFDM demodulator 464 can be reduced.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

Aspects of the Disclosure

Some but not all aspects of the exemplary embodiments disclosed above can be described in the whole or part in the following items.

a. A reception device for receiving a radio frequency (RF) signal and for obtaining a data signal from the RF signal in a desired reception channel, the reception device being operable in a normal mode and a test mode, the reception device comprising:

a frequency conversion circuit configured to convert the RF signal to an intermediate frequency (IF) signal in the normal mode;

a test signal generator configured to generate a test signal, frequency of which changes over time within a passband of the bandpass filter in the test mode;

a bandpass filter configured to bandpass-filter a signal input, including to bandpass-filter the IF signal to obtain a selection IF signal in the normal mode, and to bandpass-filter the test signal to obtain a bandpass-filtered test signal in the test mode;

a phase detector configured to detect, in the test mode from the bandpass-filtered test signal, first to nth phases corresponding to first to nth frequencies within the passband of the bandpass filter, respectively, n being an integer of two or greater; and
a demodulator configured to, in the normal mode,
perform fast Fourier transform on the selection IF signal to obtain signal components corresponding to the first to nth frequencies within the passband of the bandpass filter,
correct each of the signal components to generate corrected signal components, using differences between each of the first to nth phases of the bandpass-filtered test signal and each of first to nth reference phases, respectively, and
demodulate the corrected signal components to generate the data signal.

b. The reception device as described in item a, wherein the frequency of the test signal changes in the range of a lower limit to an upper limit of the passband.

c. The reception device as described in item a, further comprising an adjustment control circuit configured to determine the differences between the first to nth phases and the first to nth reference phases values, respectively, and generate a phase correction table in which the determined differences correspond to the first to nth frequencies, and
the demodulator includes a phase correction circuit configured to correct each of the signal components generated by the fast Fourier transform, with reference to the phase correction table.

d. The reception device as described in item a, wherein the radio frequency signal is modulated by frequency division multiplexing.

e. A reception method of a reception device configured to receive a radio frequency (RF) signal and to obtain a data signal from the RF signal in a desired reception channel, the reception device being operable in a normal mode and a test mode and including a bandpass filter configured to bandpass-filter a signal input therein, the method comprising:
in the test mode,
inputting to the bandpass filter a test signal that has a frequency changing over time within a passband of the bandpass filter, to obtain a bandpass-filtered test signal; and
detecting, from the bandpass-filtered test signal, first to nth phases corresponding to first to nth frequencies in the passband, respectively, n being an integer of two or greater; and
in the normal mode,
converting the RF signal to an intermediate frequency (IF) signal;
inputting the IF signal to the bandpass filter, to obtain a selection IF signal;
performing fast Fourier transform on the selection IF signal, to obtain signal components corresponding to the first to nth frequencies within the passband of the bandpass filter;
correcting each of the signal components to obtain corrected signal components, using differences between the first to nth phases detected from the bandpass-filtered test signal and first to nth reference phases, respectively; and
demodulating the corrected signal components to generate the data signal.

What is claimed is:

1. A reception device for receiving a radio frequency (RF) signal and for obtaining a data signal from the RF signal in a desired reception channel, the reception device being operable in a normal mode and a test mode, the reception device comprising:
a frequency conversion circuit configured to convert the RF signal to an intermediate frequency (IF) signal in the normal mode;
a bandpass filter configured to bandpass-filter a signal input therein, including
in the normal mode, to bandpass-filter the IF signal to obtain a selection IF signal, and
in the test mode, to bandpass-filter a first test signal and a second test signal to respectively obtain bandpass-filtered first and second test signals, the first test signal being within a lower transition band of the bandpass filter and having a first frequency that is lower than a frequency of the desired reception channel by a first prescribed frequency, the second test signal being within a higher transition band of the bandpass filter and having a second frequency that is higher than the frequency of the desired reception channel by a second prescribed frequency;
a test signal generator configured to generate the first and the second test signals in the test mode;
a reception intensity detection circuit configured to detect a lower frequency signal intensity from the bandpass-filtered first test signal, and a higher frequency signal intensity from the bandpass-filtered second test signal in the test mode; and
an adjustment control circuit configured to control the reception
device to work in the normal mode or the test mode, and in the test mode,
receive the lower frequency signal intensity and the higher frequency signal intensity, and
adjust a central frequency of a passband of the bandpass filter using the received lower frequency signal intensity and the received higher frequency signal intensity, so as to reduce a difference between the central frequency of the passband and the frequency of the desired reception channel.

2. The reception device according to claim 1, wherein, if the first prescribed frequency of the first test signal is the same as the second prescribed frequency of the second test signal, the adjustment control circuit changes the central frequency of the passband of the bandpass filter until the lower frequency signal intensity is substantially the same as the higher frequency signal intensity.

3. The reception device according to claim 1, wherein the adjustment control circuit repeatedly adjusts the central frequency of the passband of the bandpass filter, by a predetermined value at each time, until the central frequency of the passband of the bandpass filter substantially matches the frequency of the desired reception channel.

4. The reception device according to claim 1, wherein
the first frequency of the first test signal is a frequency of a first channel that is adjacent to the desired reception channel at a lower frequency side thereof, and
the second frequency of the second test signal is a frequency of a second channel that is adjacent to the desired reception channel at a higher frequency side thereof.

5. The reception device according to claim 4, further comprising:

a switch that is connected between the bandpass filter and the test signal generator, and is switchable between an ON state and an OFF state by the adjustment control circuit, wherein the adjustment control circuit
   sets the switch to the ON state so that the first and second test signals are supplied to the bandpass filter through the switch in the test mode, and
   sets the switch to the OFF state so that the first and second test signals are not supplied to the bandpass filter through the switch in the normal mode.

6. The reception device according to claim 1, wherein
the test signal generating unit is further configured to generate a third test signal, a frequency of which changes over time within the passband of the bandpass filter,
the bandpass filter is further configured to bandpass-filter the third test signal in the test mode, to thereby generate the bandpass-filtered third test signal,
the reception intensity detection circuit is further configured to
   in the normal mode, detect a reception intensity from the selection IF signal,
   in the test mode, detect first to nth signal intensities corresponding, respectively, to first to nth frequencies within the passband of the bandpass filter, n being an integer of two or greater, from the bandpass-filtered third test signal, and
the reception device further comprises:
   a frequency detection circuit configured to,
      in the normal mode, detect a frequency from the selection IF signal, and
      in the test mode, detect the first to nth frequencies from the bandpass-filtered third test signal; and
   a reception intensity correction circuit configured to correct the reception intensity of the selection IF signal.

7. The reception device according to claim 6, wherein
the adjustment control circuit is further configured to determine a difference between each of the first to nth signal intensities and a reference intensity corresponding thereto, and to generate a correction table in which the determined differences correspond to the first to nth frequencies, and the reception intensity correction circuit is further configured to correct each of the reception intensities using one of the differences corresponding to a frequency of said each reception intensity, with reference to the correction table.

8. The reception device according to claim 6, wherein the frequency of the third test signal changes in the range of a lower limit to an upper limit of the passband of the bandpass filter.

9. The reception device according to claim 1, wherein the adjustment control circuit is configured to stop an operation of the frequency conversion unit in the test mode.

10. The reception device according to claim 1, wherein, further comprising a demodulator that demodulates the selection IF signal to generate the data signal in the normal mode.

11. A method for adjusting a reception device configured to receive a radio frequency (RF) signal and to obtain a data signal from the RF signal in a desired reception channel, the reception device including a bandpass filter configured to bandpass-filter a signal input therein, the method comprising:
   inputting a first test signal and a second test signal to the bandpass filter, to obtain bandpass-filtered first and second test signals, respectively, the first test signal being within a lower transition band of the bandpass filter and having a first frequency that is lower than a frequency of the desired reception channel by a first prescribed frequency, the second test signal being within a higher transition band of the bandpass filter and having a second frequency that is higher than the frequency of the desired reception channel by a second prescribed frequency;
   detecting a lower frequency signal intensity and a higher frequency signal intensity from the bandpass-filtered first test signal and the bandpass-filtered second test signal, respectively; and
   adjusting a central frequency of the passband of the bandpass filter using the detected lower frequency signal intensity and the detected higher frequency signal intensity, so as to reduce a difference between the central frequency of the passband and the frequency of the desired reception channel.

* * * * *